(12) United States Patent
Tang et al.

(10) Patent No.: US 9,613,005 B2
(45) Date of Patent: Apr. 4, 2017

(54) METHOD AND APPARATUS FOR BIDIRECTIONAL TYPESETTING

(71) Applicants:Peking University Founder Group Co., Ltd., Beijing (CN); Beijing Founder Electronics Co., Ltd, Beijing (CN)

(72) Inventors: Yaojun Tang, Beijing (CN); Yanfei Yang, Beijing (CN)

(73) Assignees: Peking University Founder Group Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 346 days.

(21) Appl. No.: 14/130,237

(22) PCT Filed: Dec. 31, 2012

(86) PCT No.: PCT/CN2012/088012
§ 371 (c)(1),
(2) Date: Dec. 30, 2013

(87) PCT Pub. No.: WO2013/097805
PCT Pub. Date: Jul. 4, 2013

(65) Prior Publication Data
US 2015/0019959 A1    Jan. 15, 2015

(30) Foreign Application Priority Data

Dec. 31, 2011    (CN) .......................... 2011 1 0459186

(51) Int. Cl.
G06F 17/00 (2006.01)
G06F 17/21 (2006.01)
G06F 17/22 (2006.01)

(52) U.S. Cl.
CPC .......... *G06F 17/211* (2013.01); *G06F 17/214* (2013.01); *G06F 17/2223* (2013.01); *G06F 17/2288* (2013.01)

(58) Field of Classification Search
CPC ..... G06F 17/21; G06F 17/211; G06F 17/2223
(Continued)

(56) References Cited

U.S. PATENT DOCUMENTS 5,926,618 A * 7/1999 Watanabe .............. B41J 3/4075
358/1.11
6,496,830 B1 * 12/2002 Jenkins, Jr. ........ G06F 17/30595
(Continued)

FOREIGN PATENT DOCUMENTS

| CN | 1821994 A | 8/2006 |
| CN | 1936884 A | 3/2007 |

(Continued)

OTHER PUBLICATIONS

Unsworth, Teaching Multilieracies across the Curriculum, Google 2001, pp. 1-21.*

(Continued)

*Primary Examiner* — Cong-Lac Huynh
(74) *Attorney, Agent, or Firm* — Reising Ethington P.C.

(57) ABSTRACT

The application provides method and apparatus for bidirectional typesetting. The method for bidirectional typesetting of the present application comprises: retrieving a small sample used for a document to be bi-directionally typeset; defining at least one reverse region, wherein the reverse region consists of successive characters required to be reversed in the retrieved small sample; and determining locations where the reversed characters will be located in the documents and recording the locations into a big sample.

17 Claims, 3 Drawing Sheets

(58) Field of Classification Search
USPC .................................... 715/256, 264, 273
See application file for complete search history.

(56) References Cited

U.S. PATENT DOCUMENTS

| | | | | |
|---|---|---|---|---|
| 6,647,533 | B1* | 11/2003 | Liu | G06F 17/211 715/205 |
| 6,944,820 | B2* | 9/2005 | Feinberg | G06F 17/2223 704/1 |
| 7,975,217 | B2* | 7/2011 | Dodin | G06F 8/42 715/233 |
| 9,146,619 | B2* | 9/2015 | Atkin | G06F 3/018 |
| 2005/0108001 | A1* | 5/2005 | Aarskog | G06F 17/271 704/10 |
| 2005/0172018 | A1* | 8/2005 | Devine | G06F 11/0709 709/223 |
| 2007/0079236 | A1* | 4/2007 | Schrier | G06F 17/217 715/206 |
| 2007/0139661 | A1* | 6/2007 | Varela | G06Q 10/06 358/1.1 |
| 2010/0211866 | A1* | 8/2010 | Nicholas | G06F 17/30905 715/234 |
| 2015/0019959 | A1* | 1/2015 | Tang | G06F 17/211 715/243 |
| 2016/0070516 | A1* | 3/2016 | Fay | G06F 17/2217 358/1.11 |

FOREIGN PATENT DOCUMENTS

| | | |
|---|---|---|
| CN | 101295290 | 10/2008 |
| CN | 101295290 A | 10/2008 |
| CN | 101916246 | 12/2010 |
| CN | 101916246 A | 12/2010 |
| CN | 102023965 A | 4/2011 |
| CN | 102110108 | 6/2011 |
| CN | 102110108 A | 6/2011 |

OTHER PUBLICATIONS

Caprari, Algorithm for Text Page up/down Orientation Determination, Elsevier 2000, pp. 311-317.*
Graff et al., Developing LMF-XML Bilingual Dictionaries for Colloquial Arabic Dialects, Citeseer 2012, pp. 269-274.*
Hufflen, Multidirectional Typesetting in XSL-FO, Google 2012, pp. 1-7.*
Tayli et al., Building Bilingual Microcomputer Systems, ACM 1990, pp. 495-504.*
International Search Report for PCT/CN2012/088012, dated Apr. 4, 2013, 2 pages.
Written Opinion for PCT/CN2012/088012, dated Apr. 4, 2013, 3 pages.

* cited by examiner

جاقىندا جارىيالانعان 北京北大方正电子 »بەيجىڭ قالا ۇور،عىندارى« نىڭ قمزبا تۇيسندەرگە كوڭمل

METHOD AND APPARATUS FOR BIDIRECTIONAL TYPESETTING

CROSS REFERENCE TO RELATED APPLICATIONS

The present application claims priority of Chinese Patent Application No. 201110459186.3 filed on Dec. 31, 2011. The contents of the application are incorporated herein by reference in their entirety.

TECHNICAL FIELD

The present application relates to a field of typesetting technology, in particular, to a method and an apparatus for a bidirectional typesetting.

BACKGROUND

Different languages have different directions in reading. For example, Chinese, English or Latin are usually read (written) from left to right, while Uyghur, Arabic or Hebrew are usually read (written) from right to left. Therefore, different languages are typeset with different directions (i.e. a relationship between orders of inputting characters and locations of the typeset characters) so that characters are shown in different order in newspaper or books.

Obviously, characters are input to a small sample according to the order of their meaning rather than depending on the typesetting direction. In the existing bidirectional typesetting methods, characters in the small sample may be reversed directly, that is, the order of characters stored in the small sample is inverted, and then a big sample is constructed with the reversed small sample. For example, if there are Chinese characters "北京北大方正电子" in a document which mainly consists of Uyghur and has a fault typesetting direction from right to left, "子电正方大北京北" will be acquired by inverting "北京北大方正电子" in the small sample according to the existing bidirectional typesetting methods. However, a result containing correct Chinese and Uyghur as shown in FIG. 1 will be acquired by constructing the big sample with the reversed small sample according to the fault typesetting direction from right to left.

The inventor found that the following issue exists in the prior art: the reversed characters which are stored in the small sample are disorder, since characters in the small sample are reversed directly in the existing bidirectional typesetting methods. Therefore, it is difficult to exchange data (modify the small sample). In the above example of "北京北大方正电子", if it will be modified to be "北京市的北大方正电子" by inserting characters "市的" behind the characters "北京", since the characters "子电正方大北京北" stored in the small sample do not conform to the Chinese language habits, it is difficult for a user to decide where the characters "市的" shall be inserted. In addition, the user does not know how to reverse these characters, since other Chinese characters have been reversed. Meanwhile, due to format change, such as folding, is easy to bring an error during constructing the big sample. In the above example of "北京北大方正电子", if there are spaces for 5 Chinese characters in the first row, a typesetting result shown in FIG. 2 will be obtained according to the existing typesetting method, that is, characters "大方正电子" in the first row of the big sample are generated by reversing the first five characters "子电正方大" in the small sample and typesetting the reversed characters from right to left. The characters "北京北" are generated in the second row of the big sample by typesetting the remaining characters in the small sample. Although the order of Chinese characters (from left to right) in each row are correct, the overall typesetting result is "大方正电子北京北", which is disorder, that is, the characters which shall be in the first row are in the second row, while the characters which shall be in the second row are in the first row.

Herein, a character, a small sample and a big sample are commonly used terminology in the field of typesetting. The character usually refers to the smallest unit of text which may be input to an electronic equipment, and includes a text character (such as Chinese characters, English letters and etc.), a sign character (such as a comma, full stop, etc.), a format character (such as foldings etc.) and so on. The small sample usually refers to a file used in a process of typesetting including contents of a document (such as character, and order of the characters). The big sample usually refers to a file which is obtained from the small sample and used in a process of typesetting including typeset location information (such as where a certain character locates), in which the location of a character may be represented by a row index (i.e., which row the character locates), a location index (i.e., the place where the character locates in the row).

SUMMARY

According to one aspect of the present application, a method for bidirectional typesetting is provided. The method may comprise: retrieving a small sample formed for a document to be bi-directionally typeset; determining at least one reverse region, the reverse region consisting of successive characters required to be reversed in the retrieved small sample; and determining locations where the reversed characters will be located in the documents and recording the determined locations into a big sample.

According to another aspect of the present application, an apparatus for bidirectional typesetting is provided. The apparatus may comprise a big sample constructing unit used for constructing a big sample. The big sample constructing unit comprises a reverse region defining unit and a reverse location determining unit. The reverse region defining unit is configured to define at least one reverse region consisting of successive characters required to be reversed in a small sample used for a document to be bi-directionally typeset, during constructing the big sample. The reverse location determining unit is configured to determine locations where the reversed characters will be located in the document and record the locations into the big sample.

According to another aspect of the present application, a computer readable storage medium is provided. The medium has stored thereon the following instructions: instructions for retrieving a small sample used for a document to be bi-directionally typeset; instructions for determining at least one reverse region consisting of successive characters required to be reversed in the retrieved small sample; and instructions for determining locations where the reversed characters are to be located in the documents and recording the locations into a big sample.

According to the method for bidirectional typesetting of the present application, characters are reversed directly according to their locations when constructing the big sample, rather than according to their order in the small sample. Therefore, on one hand, meaning and order of the contents recorded in the small sample are correct to facilitate data exchange and simplify operations; on the other hand, correct locations of the reversed characters can be determined when constructing the big sample so that no error will be caused due to format changing and thus accurate typesetting results can be achieved.

The present application is especially applicable to the instances for typesetting a document that includes different languages with different reading directions in one paragraph, such as a document including Chinese and Uyghur in one paragraph or a document including English and Arabic in one paragraph.

DETAILED DESCRIPTION

Hereinafter, the present application will be explained in detail with reference to the accompanying drawings in connection with embodiments thereof to enable the skilled in the art to understand technical solutions of the application.

Figures 1, 2:
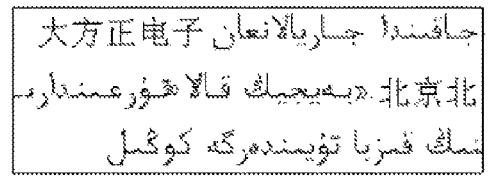
FIG. 1 is a schematic diagram of a correct typesetting result according to a method for bidirectional typesetting in the prior art.
FIG. 2 is a schematic diagram of an incorrect typesetting result when the characters are displayed in folding-lines according to a method for bidirectional typesetting in the prior art.
Figure 3:
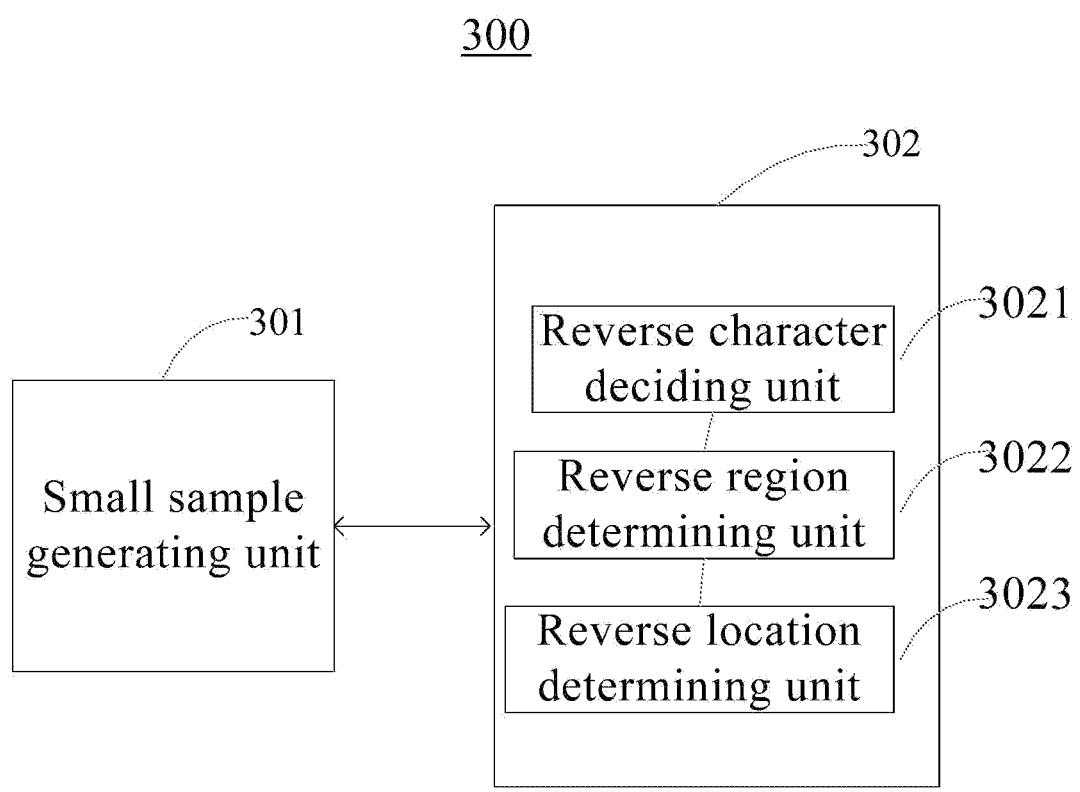
FIG. 3 is a block diagram of an apparatus for bidirectional typesetting according to an embodiment of the present application.

FIG. 3 illustrates an apparatus 300 for bidirectional typesetting according to an embodiment of the present application. As shown in FIG. 3, the apparatus 300 at least comprises a small sample generating unit 301 and a big sample constructing unit 302. The small sample generating unit 301 is configured to generate a small sample used for bi-directionally typesetting a document. For example, the unit 301 generates a file used in a process of typesetting contents of the document (such as characters, an order of the characters and etc.). The big sample constructing unit 302 comprises a reverse character deciding unit 3021, a reverse region defining unit 3022 and a reverse location determining unit 3023.

The reverse character deciding unit 3021 is configured to decide whether the characters in the small sample generated by the small sample generating unit 301 are required to be reversed or not, based on a default typesetting direction and categories of the characters. For example, the reverse character deciding unit 3021 may decide a literal character, which is read in a direction contrary to the default typesetting direction, as the character which is required to be reversed.

The reverse region defining unit 3022 is configured to define at least one reverse region which consists of successive characters required to be reversed in the small sample when constructing the big sample. Particularly, the reverse region defining unit 3022 may firstly set row indexes of the characters required to be reversed. Then, all successive characters required to be reversed and having the same row index are defined to be one reverse region.

The reverse location determining unit 3023 is configured to determine location where the reversed characters are to be located in the document and record the locations into the big sample. In an embodiment of the present application, the reverse location determining unit 3023 may firstly determine locations where the characters before reversed locate in the reverse region; and then exchange the n-th character with the (k+1−n)-th character in the reverse region to acquire the locations of the reversed characters, wherein k is total number of characters in the reverse region, n is an integer bigger than 1 and less than or equal to k/2. Alternatively, the reverse location determining unit 3023 may be configured to reverse the characters in the reverse region; and determine locations of the reversed characters in the reverse region.

Figures 4, 5:
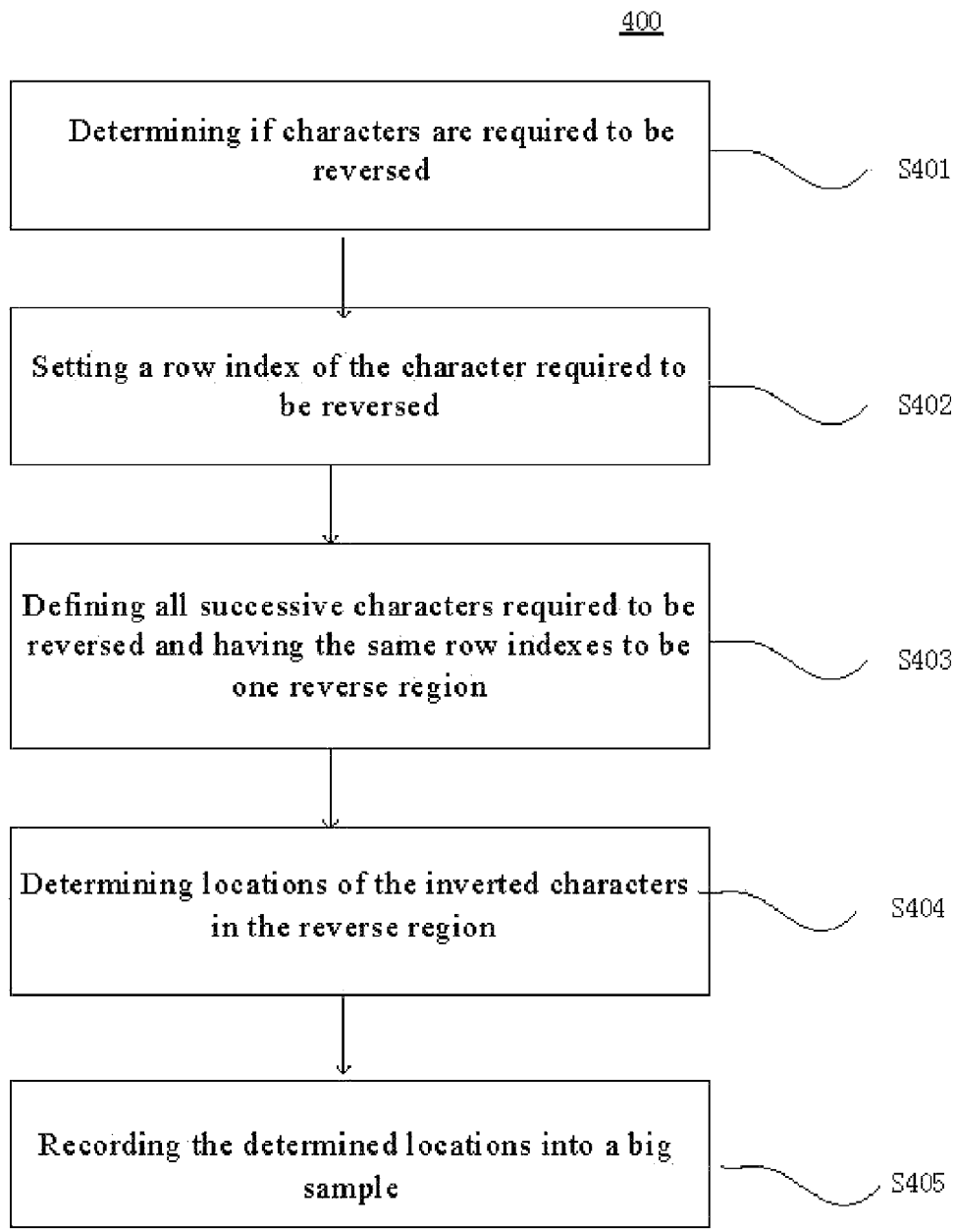
FIG. 4 is a flowchart of a method for bidirectional typesetting according to an embodiment of the present application.
FIG. 5 is a schematic diagram of a typesetting result according to the method shown in FIG. 4.

Hereinafter, a cooperation of the above-mentioned units will be further described with reference to a method 400 as shown in FIG. 4.

The method 400 begins with constructing a big sample. Particularly, in step S401, the reverse character deciding unit 3021 decides whether characters are required to be reversed or not. The step S401 is to find the characters which are required to be reversed to provide a basis for define a reverse region. Of course, the step S401 is not necessary in some cases. For example, if information of characters required to be reversed has been attached when inputting the small sample or the characters required to be reversed have been predefined when the big sample is constructed, the step S401 is not necessary. However, it is preferable to perform the step S401 in order to simplify operations, since this step may be performed automatically by computers without human intervention. The step S401 of deciding may be performed on each character in the document one by one or on a part of selected paragraphs.

Preferably, the decision of whether characters are required to be reversed may be performed based on a default typesetting direction and the categories of the characters. More preferably, literal characters, such as Chinese character, English letters and etc, with reading direction contrary to the fault typesetting direction are decided as the characters which are required to be reversed. The fault typesetting direction is preset according to usual typesetting direction for main contents of a file so as to reduce calculation task of the inverting step. In the above example of "北京北大方正电子", the main contents are the Uyghur, and the fault typesetting direction is from right to left. However, the reading direction in Chinese is usually from left to right. That is, the characters "北京北大方正电子" are required to be reversed owing to their reading direction contrary to the fault typesetting direction, while the Uyghur is not required to be reversed. The decision method can effectively reduce calculation task for determination since the requirement of reversing characters is determined based on the language type. Of course, lots of modifications may be made to the decision method, for example, we can consider whether there is special requirement for format (such as whether there is a certain paragraph in Chinese specified to be typed from right to left), or what kind of decision method may be adopt for symbolic characters such as comma, full top and spaces. The existing methods for deciding direction of symbolic characters include a preorder character decision method, a postorder character decision method, a separate decision method and so on, and these methods are well-known and the description thereof is omitted.

In step S402, the reverse region defining unit 3022 sets a row index of the character required to be reversed, that is, in which row the character shall be located. In particular, after determining the characters required to be reversed, the reverse region defining unit 3022 typesets the document in advance to determine in which of rows the characters shall be located respectively. Of course, the row index of the characters which are not required to be reversed may be determined in the meantime. Thus, all the successive characters to be reversed shall be located in one reverse region, so that errors, which are caused when characters in two rows are reversed at the same time, may be avoided. In the above example of "北京北大方正电子", if it is determined after the document is typeset in advance that, for example, only 5 Chinese characters can be contained in the first row, then the row index of characters "北京北大方" is set to be 01, while the row index of characters "正电子" is set to be 02. Of course, the step S402 may be omitted in the case that all formats in the small sample have been specified by folding-line symbols.

In step S403, the reverse region defining unit 3022 determines all successive characters required to be reversed and having the same row indexes to be one reverse region. That is, the characters in one reverse region are successively located in the same row and required to be reversed without any folding-line symbols, line breaks, or characters which are not required to be reversed therebetween. Meanwhile, all the successive characters required to be reversed in one row shall be defined in one reverse region, instead of being divided into several regions. Of course, if the characters required to be reversed in one row include several inconsecutive parts, i.e., there are characters which are not required to be reversed therebetween, these characters shall be divided into several reverse regions to ensure the characters required to be reversed in each reverse region are successive. In addition, a single character without any adjacent character to be reversed, such as a single Chinese character in one Uyghur sentence, is not necessarily defined to be a reverse region, since single characters are not successive characters and typically cannot be reversed individually. In the above example of "北京北大方正电子", 5 characters required to be reversed "北京北大方" are successively (no characters in Uyghur therebetween) located in one row (the row index 01), and thus are defined to be a first reverse region, while characters "正电子" are defined to be a second reverse region.

In step S404, the reverse location determining unit 3023 calculates locations of the inverted characters in the reverse region. For example, the reverse location determining unit 3023 may determine locations of characters in the reverse region before having been reversed, that is, locations of each characters arranged according to the fault typesetting direction. In the above example of "北京北大方正电子", as shown in table 1, "北京北大方" in the first reverse region are arranged according to the fault typesetting direction as the first, second, third, fourth and fifth characters, respectively, and their location indexes (or be referred to as locations x, i.e., the place where the typeset characters is located according to the fault typesetting direction) in the row are 10, 11, 12, 13 and 14, respectively. Each location index represents a specific location in the row and corresponding typeset characters shall be located in their specific locations.

Locations of two characters after reversed may be acquired by exchanging the n-th character with the (k+1−n)-th character, wherein k is total number of characters in the reverse region, n is an integer bigger than 1 and less than or equal to k/2. In the above example of "北京北大方正电子", k=5 in the first reverse region. Therefore, when n=1, the n-th (the first) character before reversed is "北" and has location index in the row of 10, while the (k+1−n)-th (the fifth) character is "方" and has location index in the row of 14. Then, these two characters are reversed by exchanging with each other, that is, the location index of "北" becomes 14, while that of "方" becomes 10. Then, locations of all the characters in the reverse region after reversed may be retrieved by performing the above similar process on all the possible number for n (in the present embodiment, n=1 and 2).

TABLE 1 a table illustrating a process of exchanging characters in one reverse region

| characters | 北 | 京 | 北 | 大 | 方 |
|---|---|---|---|---|---|
| Sequence number of characters (n) | 1 | 2 | 3 | 4 | 5 |
| Location index before reversed | 10 | 11 | 12 | 13 | 14 |
| Sequence number of characters exchanged correspondingly (n + k − 1) | 5 | 4 | 3 | 2 | 1 |
| Location index after reversed | 14 | 13 | 12 | 11 | 10 |

Similarly, typesetting result shown in FIG. 3 may be retrieved by determining locations of characters "正电子" in the second reverse region after reversed.

In the present embodiment, since characters are reversed when the big sample is constructed, characters in the correct sequence are recorded in the small sample to facilitate modification. Meanwhile, since characters in each reverse region are successive, when the format thereof is changed, such as line-folding, the reverse region may be divided into two parts in which all the characters are located where they shall be located (such as "北京北大方" must be located in the first row, while "正电子" must be located in the second row). Thus, correct locations of all characters can be retrieved after inverting process performed in respective reverse regions and there will be no error which otherwise will be caused in the existing bidirectional typesetting method, for example "北京北" is arranged in the second row, while "正电子" is arranged in the first row.

Alternatively, in step S404, the reverse location determining unit 3023 may calculate locations of characters in the reverse region by the following steps: 1) reversing the characters in the reverse region; and 2) determining locations of the reversed characters in the reverse region. That is, in step S404, firstly reversing all the characters in the reverse region, then typesetting the reversed characters according to the fault typesetting direction to acquire correct results. In the above example of "北京北大方正电子", characters "北京北大方" in the first reverse region are reversed directly as "方大北京北". Then the reversed characters "方大北京北" are typeset according to the fault typesetting direction, i.e., from right to left. Thus, the location of each typeset character is the location of each reversed character in the reverse region. Similarly, the above process is performed on the characters "正电子" in the second reverse region to acquire a result as shown in FIG. 5. The aim of the present application can be achieved by reversing characters before determining locations of characters, without exchanging characters after arranging.

In step S405, the reverse location determining unit 3023 record the locations (or referred to as index) of reversed characters into the big sample. In addition, some information, such as location information of characters which are not reversed and format information of the document may also be recorded into the big sample at the same time. As shown in FIG. 5, a typesetting result according to the method shown in FIG. 4 is shown.

According to the above method and apparatus of the present application, characters are reversed directly according to their locations when constructing the big sample, rather than according to their order in the small sample. Therefore, on one hand, meaning and order of the contents recorded in the small sample are correct to facilitate data exchange and simplify operations; on the other hand, correct locations of the reversed characters can be determined when constructing the big sample so that no error can be caused due to format changing and thus accurate typesetting results can be achieved.

The disclosed and functional operations described in the other embodiments and the specification can be implemented by digital circuits or computer software, firmware or hardware comprising structures and their equivalent disclosed in the specification, or by a combination of one or more of their implementation. The disclosed and other embodiments can be implemented as one or more computer program products, that is, one or more modules executed by computer programs encoded in a computer readable medium, so that operation thereof can be performed or controlled by a data processing device. The computer readable medium can be machine readable storage equipments, machine readable storage substrates, memory devices, synthetic materials affecting machine readable signal propagation or one or more combination thereof. The term "data processing device" contains all devices, equipments and machines for processing data, for example, includes a programmable processor, a computer, a plurality of processor or computer. Except to the hardware, the device may include codes constructing an execution environment of a computer program, for example, codes constructing a processor firmware, a protocol branch, a database management system and an operating system or one or more of their combination. Propagation signals are generated artificially, such as electrical, optical or electromagnetic signals generated by a machine, which are generated to encode the information to be transmitted to a suitable receiver device.

A computer program (also referred to as a program, software, application software, script or code) can be written in any form of language including compiled or interpreted languages, and it can be deployed in any form including an independent program or a module, component, or other units used in subroutine in a computing environment. It is not necessary that a computer program corresponds to a file in a file system. The program may be stored in the part of the file that stores other programs or data (for example, one or multiple scripts stored in a markup language document), in a single document dedicated to the discussed procedure, or in a plurality of cooperative files (for example, files storing one or more modules, subroutines or codes). The computer program can be deployed to execute in a computer or in a plurality of computers which are located in one place or distributed in multiple places and interconnected by a communication network.

It is understood that, the above embodiments are exemplary only to illustrate the principle of the present application, but is not limited to this. For the skilled in the art, various modifications and variations can be made to the present application without departing from the spirit and essence of the present application, and all kinds of modifications and variations can also be considered be included within the scope of protection of the application.

What is claimed is:

1. A method for bidirectional typesetting, comprising:
   retrieving a small sample formed for a document to be bi-directionally typeset;
   determining at least one reverse region, the reverse region consisting of successive characters required to be reversed in the retrieved small sample; and
   determining locations where the reversed characters will be located in the documents and recording the determined locations into a big sample,
   wherein the small sample is a file comprising a content of the document, and the big sample is a file obtained from the small sample and comprising typeset location information of the document, and
   wherein the step of determining at least one reverse region comprises:
   setting row indexes of the characters required to be reversed in the retrieved small sample; and
   defining all successive characters required to be reversed and having a same row index to be one reverse region.

2. The method according to claim 1, further comprising:
   deciding whether characters in the retrieved small sample are required to be reversed or not according to a fault typesetting direction and categories of characters.

3. The method according to claim 2, wherein the step of deciding comprises:
   deciding whether or not a reading direction of characters in the retrieved small sample is contrary to the fault typesetting direction, and
   if yes, the characters are determined as the characters required to be reversed.

4. The method according to claim 3, wherein the step of determining locations where the reversed characters will be located in the documents comprises:
   determining, in the reverse region, locations where the characters will be located before they are reversed; and
   exchanging the n-th character with the (k+1−n)-th character in the reverse region to acquire the locations of the reversed characters, wherein k is total number of characters in the reverse region, n is an integer bigger than 1 and less than or equal to k/2.

5. The method according to claim 3, wherein the step of determining locations where the reversed characters will be located in the documents comprises:
   reversing the characters in the reverse region; and
   determining locations of the reversed characters in the reverse region.

6. The method according to claim 2, wherein the step of determining locations where the reversed characters will be located in the documents comprises:
   determining, in the reverse region, locations where the characters will be located before they are reversed; and
   exchanging the n-th character with the (k+1−n)-th character in the reverse region to acquire the locations of the reversed characters, wherein k is total number of characters in the reverse region, n is an integer bigger than 1 and less than or equal to k/2.

7. The method according to claim 1, wherein the step of determining locations where the reversed characters will be located in the documents comprises:
   determining, in the reverse region, locations where the characters will be located before they are reversed; and
   exchanging the n-th character with the (k+1−n)-th character in the reverse region to acquire the locations of the reversed characters, wherein k is total number of characters in the reverse region, n is an integer bigger than 1 and less than or equal to k/2.

8. The method according to claim 7, wherein the step of determining locations where the reversed characters will be located in the documents comprises:

reversing the characters in the reverse region; and
determining locations of the reversed characters in the reverse region.

9. The method according to claim 1, wherein the step of determining locations where the reversed characters will be located in the documents comprises:
reversing the characters in the reverse region; and
determining locations of the reversed characters in the reverse region.

10. The method according to claim 1, wherein the step of determining locations where the reversed characters will be located in the documents comprises:
determining, in the reverse region, locations where the characters will be located before they are reversed; and
exchanging the n-th character with the (k+1−n)-th character in the reverse region to acquire the locations of the reversed characters, wherein k is total number of characters in the reverse region, n is an integer bigger than 1 and less than or equal to k/2.

11. The method according to claim 1, wherein the step of determining locations where the reversed characters will be located in the documents comprises:
reversing the characters in the reverse region; and
determining locations of the reversed characters in the reverse region.

12. An apparatus for bidirectional typesetting comprising:
a big sample constructing unit used for constructing a big sample, wherein, the big sample constructing unit comprises:
a reverse region determining unit configured to determine, during constructing the big sample, at least one reverse region consisting of successive characters required to be reversed in a small sample used for a document to be bi-directionally typeset; and
a reverse location determining unit configured to determine locations where the reversed characters will be located in the document and record the determined locations into the big sample,
wherein the small sample is a file comprising a content of the document, and the big sample is a file obtained from the small sample and comprising typeset location information of the document, and
wherein the reverse region determining unit is further configured to set row indexes of the characters required to be reversed; and define all successive characters required to be reversed and having a same row index to be one reverse region.

13. The apparatus according to claim 12, further comprising:
a reverse character deciding unit configured to decide whether or not characters in the small sample are required to be reversed according to a fault typesetting direction and categories of characters.

14. The apparatus according to claim 12, further comprising:
a reverse character deciding unit configured to decide the characters having reading directions contrary to a fault typesetting direction as the characters required to be reversed.

15. The apparatus according to claim 12, wherein the reverse location determining unit is further configured to determine locations where the characters before reversed will be located in the reverse region; and exchange the n-th character with the (k+1−n)-th character in the reverse region so as to retrieve the locations of the reversed characters, wherein k is total number of characters in the reverse region, n is an integer bigger than 1 and less than or equal to k/2.

16. The apparatus according to claim 12, wherein the reverse location determining unit is further configured to reverse the characters in the reverse region; and determine locations of the reversed characters in the reverse region.

17. A non-transitory computer readable storage medium on which is stored the following instructions:
instructions for retrieving a small sample used for a document to be bi-directionally typeset;
instructions for determining at least one reverse region consisting of successive characters required to be reversed in the retrieved small sample; and
instructions for determining locations where the reversed characters are to be located in the documents and recording the locations into a big sample,
wherein the small sample is a file comprising a content of the document, and the big sample is a file obtained from the small sample and comprising typeset location information of the document, and
wherein the determining the at least one reverse region comprises:
setting row indexes of the characters required to be reversed in the retrieved small sample; and
defining all successive characters required to be reversed and having a same row index to be one reverse region.

* * * * *